US00RE48753E

(19) United States
(12) Reissued Patent
Okuda

(10) Patent Number: US RE48,753 E
(45) Date of Reissued Patent: Sep. 28, 2021

(54) PROJECTION IMAGE DISPLAY DEVICE INCLUDING OPTICAL SYSTEM

(71) Applicant: Panasonic Intellectual Property Management Co., Ltd., Osaka (JP)

(72) Inventor: Michihiro Okuda, Osaka (JP)

(73) Assignee: PANASONIC INTELLECTUAL PROPERTY MANAGEMENT CO., LTD., Osaka (JP)

(21) Appl. No.: 16/369,397

(22) Filed: Mar. 29, 2019

Related U.S. Patent Documents

Reissue of:
(64) Patent No.: 9,958,765
Issued: May 1, 2018
Appl. No.: 15/297,852
Filed: Oct. 19, 2016

(30) Foreign Application Priority Data

Feb. 10, 2016 (JP) ..... 2016-023246

(51) Int. Cl.
*G03B 21/20* (2006.01)
*G02B 27/09* (2006.01)
(Continued)

(52) U.S. Cl.
CPC ..... *G03B 21/208* (2013.01); *G02B 27/0927* (2013.01); *G02B 27/0961* (2013.01);
(Continued)

(58) Field of Classification Search
CPC ..... G03B 21/208; G03B 21/204; G03B 21/2013; G03B 21/2033; G02B 27/141;
(Continued)

(56) References Cited

U.S. PATENT DOCUMENTS 9,958,765 B2 * 5/2018 Okuda ..... G03B 21/208
2006/0114423 A1 * 6/2006 Maeda ..... G03B 21/2053 353/94

(Continued)

FOREIGN PATENT DOCUMENTS

JP 2006-309231 A 11/2006
JP 2011-158500 A 8/2011

(Continued)

OTHER PUBLICATIONS

Japanese Office Action dated Aug. 25, 2020, issued in the corresponding Japanese Patent Application No. 2016-202662.

(Continued)

*Primary Examiner* — Kenneth Whittington
(74) *Attorney, Agent, or Firm* — McDermott Will and Emery LLP

(57) ABSTRACT

A projection image display device includes: laser diodes which emit excitation light; a top-hat diffusing element which diffuses and provides the excitation light with a top-hat intensity distribution; a phosphor which emits light when illuminated by the excitation light diffused by the top-hat diffusing element; an integrator rod which homogenizes the light emitted by the phosphor; DMDs which modulate the light homogenized by the integrator rod; and a projector which projects the light modulated by the DMDs.

8 Claims, 14 Drawing Sheets

(51) Int. Cl.
*G02B 27/14* (2006.01)
*G02B 5/04* (2006.01)
*G02B 17/04* (2006.01)

(52) U.S. Cl.
CPC ..... *G02B 27/141* (2013.01); *G03B 21/204* (2013.01); *G03B 21/2013* (2013.01); *G02B 5/04* (2013.01); *G02B 17/04* (2013.01)

(58) Field of Classification Search
CPC ..... G02B 27/0927; G02B 27/0961; G02B 17/04; G02B 5/04
USPC ..... 353/31, 38; 362/84, 260
See application file for complete search history.

(56) References Cited

U.S. PATENT DOCUMENTS

2006/0222041 A1* 10/2006 Moriwaka ..... B23K 26/067 372/101
2006/0238720 A1 10/2006 Lee et al.
2011/0102748 A1* 5/2011 Shevlin ..... G02B 26/0833 353/38
2011/0116053 A1* 5/2011 Kaseya ..... G02B 27/0961 353/34
2011/0187999 A1 8/2011 Hirata et al.
2011/0222025 A1* 9/2011 Sakaguchi ..... G02B 27/0994 353/94
2012/0133904 A1 5/2012 Akiyama
2012/0147331 A1 6/2012 Miyazaki
2012/0268503 A1 10/2012 Sugiyama et al.
2013/0083295 A1 4/2013 Miyazaki
2014/0132937 A1* 5/2014 Daniels ..... G03B 21/208 353/98
2014/0240676 A1* 8/2014 Maes ..... G03B 21/204 353/20
2015/0286119 A1 10/2015 Miyazaki
2015/0301438 A1* 10/2015 Akiyama ..... G03B 21/208 353/20
2015/0338729 A1* 11/2015 Kawasumi ..... G03B 21/008 353/99
2016/0062223 A1* 3/2016 Akiyama ..... H04N 9/3152 353/31
2017/0199450 A1* 7/2017 Matsubara ..... G03B 21/142
2017/0227837 A1* 8/2017 Okuda ..... G02B 27/0961

FOREIGN PATENT DOCUMENTS

JP 2012-141581 A 7/2012
JP 2012-150212 A 8/2012
JP 2012-234162 A 11/2012
JP 2013-076836 A 4/2013
JP 5699568 B2 4/2015
JP 2015-102818 A 6/2015

OTHER PUBLICATIONS

Japanese Office Action dated Jan. 12, 2021 issued in the corresponding Japanese Patent Application No. 2020-202266.

* cited by examiner

PROJECTION IMAGE DISPLAY DEVICE INCLUDING OPTICAL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application *is a reissue application of U.S. Pat. No. 9,958,765 issued on May 1, 2018 from U.S. patent application Ser. No. 15/297,852 filed Oct. 19, 2016, which in turn* claims the benefit of priority of Japanese [Patent] Application Number 2016-023246 filed on Feb. 10, 2016, [the entire content of which is] *the disclosures of which are* hereby incorporated by reference.

BACKGROUND

1. Technical Field

The present disclosure relates to a projection image display device which includes a light source which emits excitation light, and a light-source device which includes a light emitter which emits light in response to the excitation light.

2. Description of the Related Art

Japanese Patent No. 5699568 disclosures a solid-state light source projector which uses a phosphor excited by a laser. The projector homogenizes a light intensity distribution of excitation light which is to illuminate the phosphor, using a pair of lens arrays, to enhance the light emission efficiency of the phosphor.

SUMMARY

The present disclosure provides a projection image display device which has increased light utilization efficiency.

A projection image display device according to the present disclosure includes: a laser light source which emits excitation light; a top-hat diffusing element which diffuses and provides the excitation light with a top-hat intensity distribution; a light emitter which emits light when illuminated by the excitation light diffused by the top-hat diffusing element; a light homogenization element which homogenizes an intensity distribution of the light emitted by the light emitter; a light modulating element which modulates the light whose intensity distribution has been homogenized by the light homogenization element; and a projector which projects, as an image, the light modulated by the light modulating element.

According to the present disclosure, the projection image display device having increased light utilization efficiency is achieved.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1.0B is a diagram illustrating a light intensity in x-cross section (cross section where y=0) and a light intensity in y-cross section (cross section where x=0) in FIG. 10A;

DETAILED DESCRIPTION OF THE EMBODIMENTS

Hereinafter, embodiments according to the present disclosure will be described in detail, with reference to the accompanying drawings. It should be noted that unnecessarily detailed description may be omitted. For example, detailed description of well-known matters or description previously set forth with respect to substantially the same configuration may be omitted. This is to avoid unnecessary redundancy of description below and for facilitating an understanding of the present disclosure by a person skilled in the art.

The accompanying drawings and the description below are for a thorough understanding of the present disclosure by a person skilled in the art, and are not intended to be limiting the subject matter recited in the claims appended hereto. The accompanying drawings are schematic views and do not necessarily illustrate the present disclosure precisely. In the figures, the same reference sign is used to refer to substantially the same configuration, and thus duplicate description may be omitted or simplified.

Embodiment 1

(Projection Image Display Device)

Figure 1:
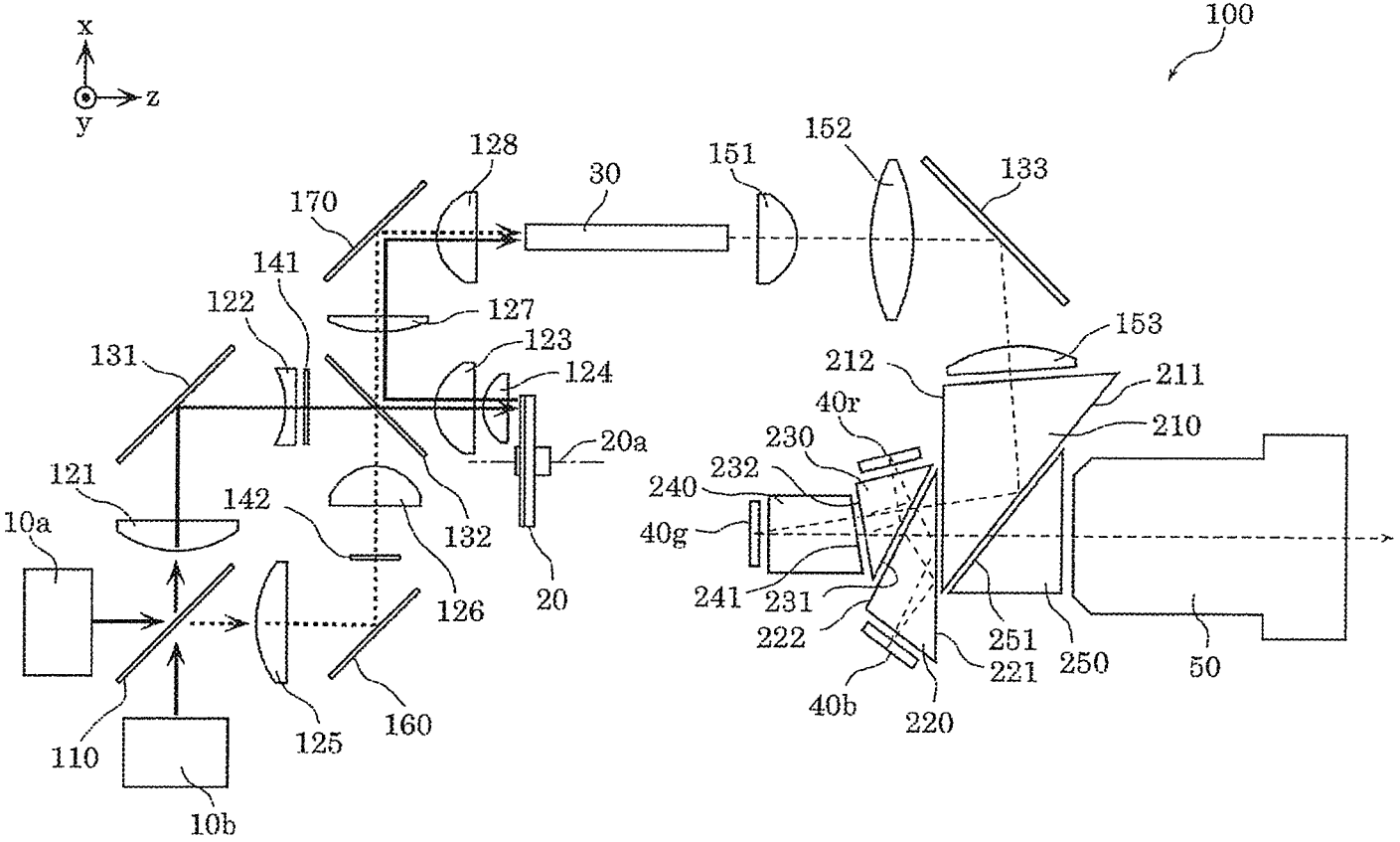
FIG. 1. is an optical configuration diagram of a projection image display device according to Embodiment 1 of the present disclosure.
Figure 2A:
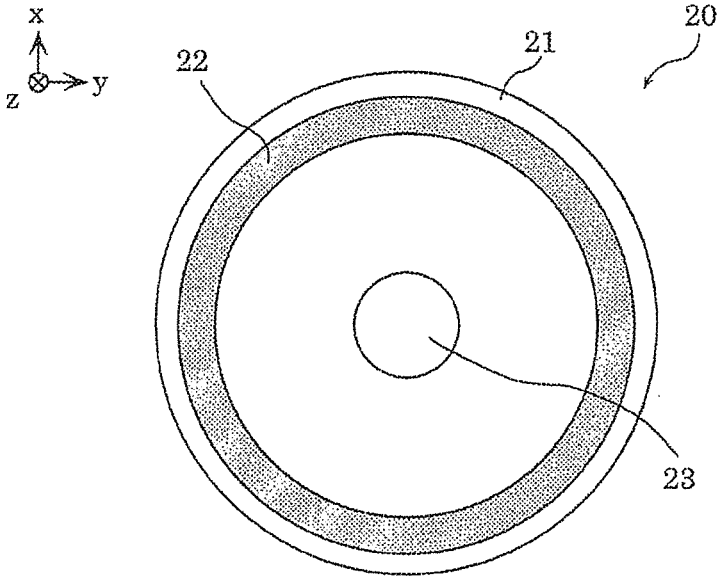
FIG. 2A is a plan view of a phosphor wheel according to Embodiment 1.
Figure 2B:
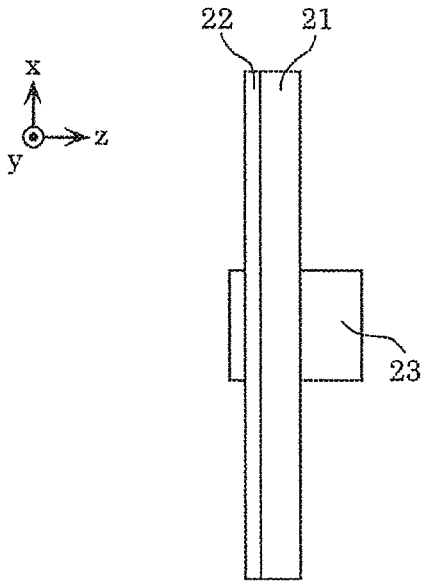
FIG. 2B is a side view of the phosphor wheel according to Embodiment 1.

In the following, a configuration of a projection image display device according to Embodiment 1 of the present disclosure is described with reference to FIGS. 1, 2A, and 2B. FIG. 1 is an optical configuration diagram of the projection image display device according to Embodiment 1. FIG. 2A is a plan view of a phosphor wheel according to Embodiment 1. FIG. 2B is a side view of the phosphor wheel according to Embodiment 1.

As illustrated in FIG. 1, projection image display device 100 includes first light-source unit 10a, second light-source unit 10b, phosphor wheel 20, integrator rod 30, DMD 40r, DMD 40g, DMD 40b, and projector 50.

First light-source unit 10a and second light-source unit 10b are each configured of solid-state light sources such as laser diodes (LD) or light emitting diodes (LED), for example. In Embodiment 1 among laser diodes, particularly, laser diodes which emit blue light are used as the light sources. The laser diode, as used herein, is, by way of example, a laser light source.

Outgoing light from first light-source unit 10a and outgoing light from second light-source unit 10b are blue light having wavelengths of 440 nm or greater and 470 nm or less, for example. The blue light are used also as excitation light for exciting phosphor 22 on phosphor wheel 20. First light-source unit 10a and second light-source unit 10b are described in detail below (see FIGS. 4A and 4B).

Phosphor wheel 20 rotates about rotational axis 20a extending along the optical axis of the excitation light. Phosphor wheel 20 is a reflective phosphor wheel which emits light in a direction opposite a direction in which the excitation light enters phosphor wheel 20.

Specifically, as illustrated in FIGS. 2A and 2B, phosphor wheel 20 includes substrate 21, phosphor 22 which is applied, on substrate 21, in an annular shape along a direction of rotation of substrate 21, and motor 23 for rotating substrate 21 having phosphor 22 formed thereon. It should be noted that a reflective film is formed on a surface of substrate 21 for reflecting phosphorus light emitted by phosphor 22. Phosphor 22 emits phosphorus light containing yellow light, in response to the excitation light emitted by first light-source unit 10a and second light-source unit 10b. Phosphor 22, specifically, emits light when illuminated by excitation light diffused by top-hat diffusing element 141 and condensed by lenses 123 and 124. Phosphor 22 is, by way of example, a light emitter.

Phosphor 22 emits phosphorus light mainly in a range of green-yellow wavelengths. Preferably, phosphor 22 is highly tolerant to thermal quenching and efficiently emits phosphorus light by efficiently absorbing blue excitation light. Phosphor 22 is, for example, activated with cerium as represented by $Y_3Al_5O_{12}:Ce^{3+}$, and has a garnet structure.

Integrator rod 30 is a solid rod configured of a transparent member such as a glass. Integrator rod 30 homogenizes spatial distributions of intensities of the light emitted by first light-source unit 10a and second light-source unit 10b. It should be noted that integrator rod 30 may be a hollow rod having an inner wall configured of a mirror surface. Integrator rod 30 is, by way of example, a light homogenization element.

A DMD (DMD 40r, DMD 40g, or DMD 40b) modulates the light emitted by first light-source unit 10a, second light-source unit 10b, and phosphor wheel 20. Specifically, the DMD is configured of movable micro mirrors. Each micro mirror basically corresponds to one pixel. The DMD changes an angle of each micro mirror to switch to reflect or not reflect the light to projector 50. The DMDs are, by way of example, a light modulating element.

In Embodiment 1, projection image display device 100 includes DMD 40r, DMD 40g, and DMD 40b as the DMDs. DMD 40r modulates red component light, based on a red video signal. DMD 40g modulates green component light, based on a green video signal. DMD 40b modulates blue component light, based on a blue video signal.

Projection unit 50 projects the light modulated by DMD 40r, DMD 40g, and DMD 40b as an image onto a projection surface. In other words, projector 50 projects image light.

Projection image display device 100 also includes splitting and combining mirror 110, a lens group, a mirror group, and a diffuser group. Projection image display device 100, specifically, includes the lens group comprising lenses 121, 122, 123, 124, 125, 126, 127, 128, 151, 152, and 153, and the mirror group comprising mirror 131, dichroic mirror 132, mirror 133, mirror 160, and mirror 170. Projection image display device 100 includes the diffuser group comprising top-hat diffusing element 141 and diffuser 142.

Splitting and combining mirror 110 combines the outgoing light from first light-source unit 10a and the outgoing light from second light-source unit 10b, and splits portions of the outgoing light from first light-source unit 10a and outgoing light from second light-source unit 10b. It should be noted that splitting and combining mirror 110 is, by way of example, a splitting and combining optical element, and described in detail below (see FIG. 5).

Lens 121 is a condenser lens which condenses the outgoing light from first light-source unit 10a and the outgoing light from second light-source unit 10b. Lens 122 is a concave lens which collimates the light condensed by lens 121. Lenses 123 and 124 are condenser lenses which condense the excitation light onto phosphor 22 on phosphor wheel 20 and collimate the light emitted by phosphor 22.

Lens 125 is a condenser lens which condenses the outgoing light from first light-source unit 10a and the outgoing light from second light-source unit 10b. Lens 126 is a condenser lens disposed after a point of condensation of the light condensed by lens 125, and re-collimates the light condensed by lens 125. Lenses 127 and 128 are relay lenses which guide, to integrator rod 30, the outgoing light from first light-source unit 10a, the outgoing light from second light-source unit 10, and the outgoing light from the phosphor wheel. Lenses 151, 152, and 153 are relay lenses which cause outgoing light from integrator rod 30 to be generally imaged on each DMD.

Mirrors 131, 133, 160, and 170 bend optical paths. Dichroic mirror 132 has characteristics of passing blue light therethrough and reflecting yellow light. Dichroic mirror 132 is, by way of example, a combining optical element.

Top-hat diffusing element 141 is a diffuser which diffuses generally collimated light incident thereon. The structure of top-hat diffusing element 141 is described in detail below. Diffuser 142 is disposed in the vicinity of the point of condensation of light flux condensed by lens 125, and diffuses the light flux. Diffuser 142 is configured of a glass substrate which has a surface having fine roughness, for example. The fine roughness may be formed only on one side of the glass substrate or may be formed on both sides of the glass substrate.

It should be noted that the shapes of the lenses are adjusted, such that a point emission of the light emitted by phosphor wheel 20 and an entrance face of integrator rod 30 are generally conjugate with each other and diffuser 142 and the entrance face of integrator rod 30 are generally conjugate with each other.

Projection image display device 100 also includes a prism group comprising prisms 210, 220, 230, 240, and 250.

Prism 210 is configured of a light-transmissive material and has surface 211 that is facing prism 250, and surface 212 that is facing prism 220. An air-gap is formed between prism 210 (surface 211) and prism 250 (surface 251) and an angle (angle of incidence), at which light entered prism 210 is incident on surface 211, is greater than a critical angle. Thus, the light entered prism 210 is reflected by surface 211. On the other hand, although an air-gap is formed between prism 210 (surface 212) and prism 220 (surface 221), an angle (angles of incidence), at which the light reflected by surface 211 is incident on surface 212, is smaller than a critical angle. Thus, the light reflected by surface 211 transmits through surface 212.

Prism 220 is configured of a light-transmissive material and has surface 221 that is facing prism 210, and surface 222 that is facing prism 230. Surface 222 is a dichroic mirror surface which passes red component light and green component light therethrough and reflects blue component light. Thus, in the light reflected by surface 211, the red component light and the green component light transmit through surface 222 and the blue component light is reflected by surface 222. The clue component light reflected by surface 222 is further reflected by surface 221.

An air-gap is formed between prism 210 (surface 212) and prism 220 (surface 221), and angles (angle of incidence), at which blue component light reflected by surface 222 and blue component light exited DMD 40b enter surface 221, are greater than critical angles. For this reason, the blue component light reflected by surface 222 and the blue component light exited DMD 40b are reflected by surface 221 and enter DMD 40b.

The blue component light entered DMD 40b is reflected by DMD 40b, re-reflected by surface 221, and then enters surface 222. An angle of incidence at which the blue component light enters surface 222 is smaller than a critical angle. Thus, the blue component light entered surface 222 transmits through surface 221.

Prism 230 is configured of a light-transmissive material and has surface 231 that is facing prism 220, and surface 232 that is facing prism 240. Surface 232 is a dichroic mirror surface which passes green component light; therethrough and reflects red component light. Thus, green component light of the light having transmitted through surface 231 transmits through surface 232, and red component light of the light having transmitted through surface 231 is reflected by surface 232. Red component light reflected by surface 232 is further reflected by surface 231. Green component light exited DMD 40g transmits through surface 232.

An air-gap is formed between prism 220 (surface 222) and prism 230 (surface 231), and angles (angle of incidence), at which the red component light reflected by surface 232 and red component light exited DMD 40r re-enter surface 231, are greater than critical angles. For this reason, the red component light reflected by surface 232 and the red component light exited DMD 40r are reflected by surface 231 and enter DMD 40r. The red component light entered DMD 40r is reflected by DMD 40r, re-reflected by surface 231, further reflected by surface 232, and then enters surface 231. An angle of incidence at which the red component light enters surface 231 is smaller than the critical angle. Thus, the red component light entered surface 231 transmits through surface 231.

Prism 240 is configured of a light-transmissive material and has surface 241 that is facing prism 230. Surface 241 passes green component light therethrough. Thus, the green component light having transmitted through surface 232 transmits through surface 241 and enters DMD 40g. The green component light entered DMD 40g is reflected by DMD 40g and transmits through prism 240.

Prism 250 is configured of a light-transmissive material and has surface 251 that is facing prism 210.

In summary, the blue component light is (1) reflected by surface 211, (2) reflected by surface 222, (3) reflected by surface 221, (4) reflected by DMD 40b, (5) reflected by surface 221, (6) reflected by surface 222, and (7) transmits through surface 221 and surface 251. This causes the blue component light to be modulated by DMD 40b and guided to projector 50.

The red component light is (1) reflected by surface 211, (2) transmits through surface 212, surface 221, surface 222, and surface 231 and then is reflected by surface 232, (3) reflected by surface 231, (4) reflected by DMD 40r, (5) reflected by surface 231, (6) reflected by surface 232, and (7) transmits through surface 231, surface 232, surface 221, surface 212, surface 211, and surface 251. This causes the red component light to be modulated by DMD 40r and guided to projector 50.

The green component light is (1) reflected by surface 211, (2) transmits through surface 212, surface 221, surface 222, surface 231, surface 232, and surface 241, and then is reflected by DMD 40g, and (3) transmits through surface 241, surface 232, surface 231, surface 222, surface 221, surface 212, surface 211, and surface 251. This causes the green component light to be modulated by DMD 40g and guided to projector 50.

(Light-Source Device)

Figure 3:
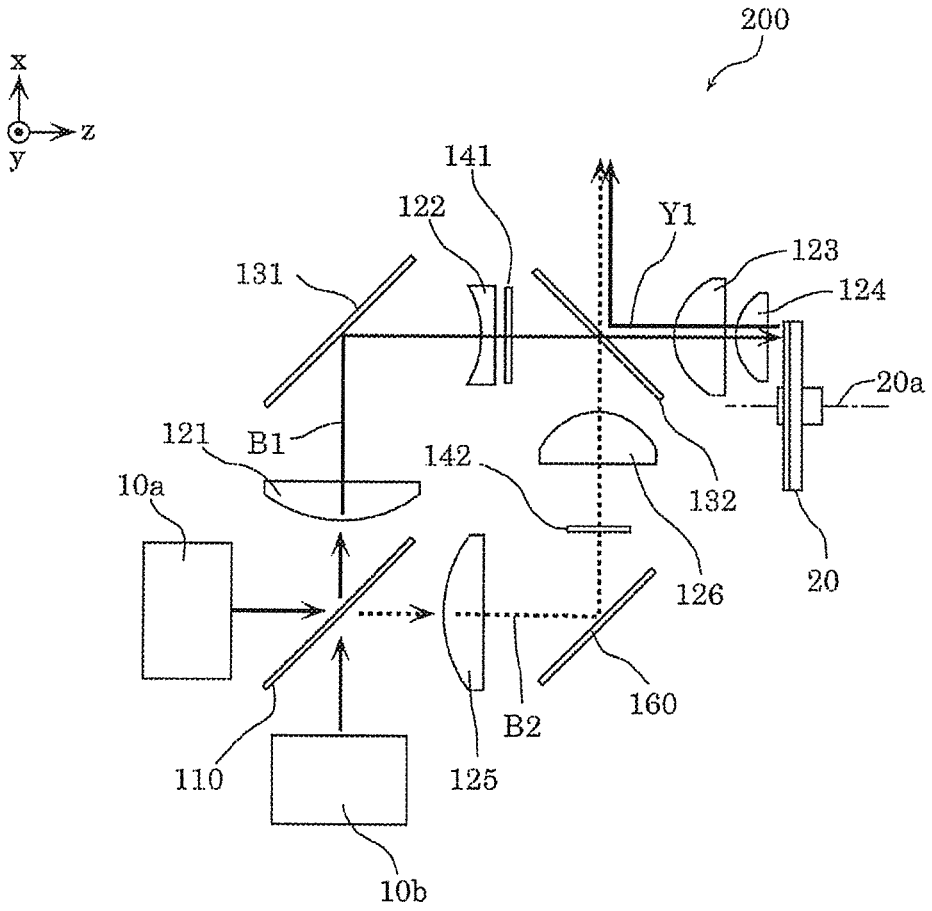
FIG. 3 is an optical configuration diagram of a light-source device according to Embodiment 1.

In the following, a light-source device according to Embodiment 1 is described. FIG. 3 is an optical configuration diagram of the light-source device according to Embodiment 1.

Light-source device 200 is used by projection image display device 100 shown in FIG. 1. Light-source device 200 is configured, mainly, of first light-source unit 10a, second light-source unit 10b, splitting and combining mirror 110, and phosphor wheel 20. Light-source device 200 additionally includes the lens group and the mirror group. Description of these components has already been set forth and thus omitted.

Figure 4A:
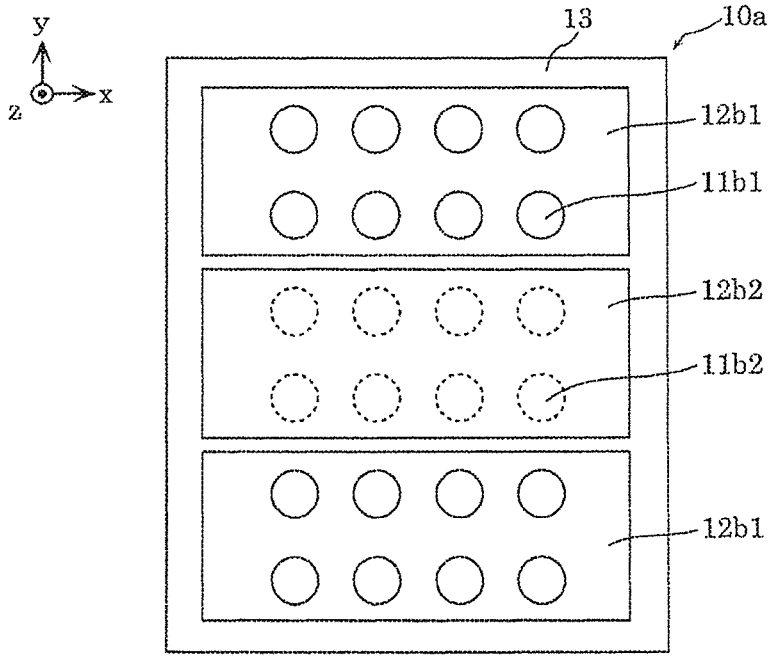
FIG. 4A is a diagram of a first light-source unit according to Embodiment 1 when viewed in negative z direction in FIG. 3.
Figure 4B:
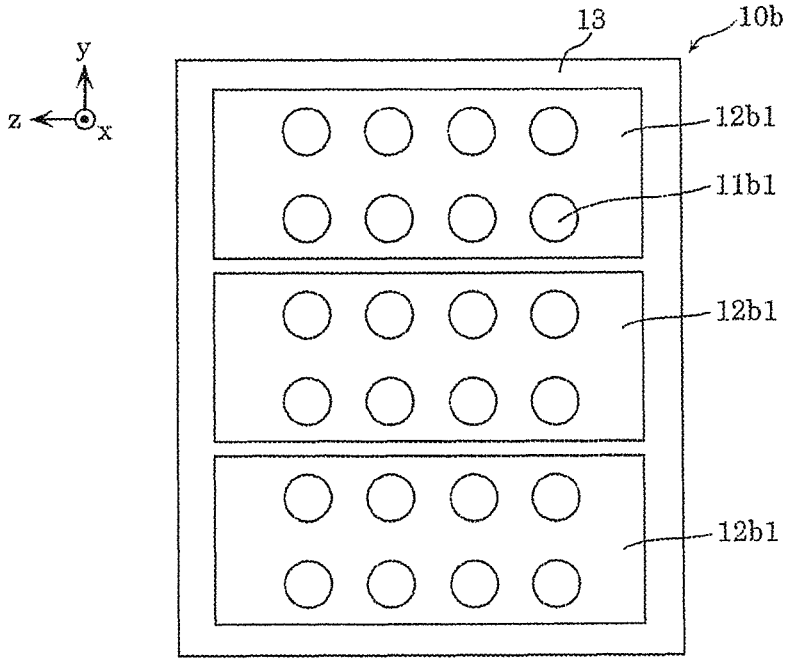
FIG. 4B is a diagram of a second light-source unit according to Embodiment 1 when viewed in negative x direction in FIG. 3.

Initially, first light-source unit 10a and second light-source unit 10b are described in detail, with reference to FIGS. 4A and 4B. FIG. 4A is a diagram of first light-source unit 10a when viewed in negative z direction in FIG. 3. FIG.

4B is a diagram of second light-source unit 10b when viewed in negative x direction in FIG. 3.

First light-source unit 10a includes three light-source blocks, which are two light-source blocks 12b1 and one light-source block 12b2. Specifically, one light-source block 12b1 and one light-source block 12b1 are disposed on the top portion (end portion in positive y direction) and the bottom portion (end portion in negative y direction), respectively, of first light-source unit 10a. Light-source block 12b2 is disposed in the middle of first light-source unit 10a, that is, between the two light-source blocks 12b1. On the other hand, second light-source unit 106 includes three light-source blocks 12b1 arranged side by side in y direction. It should be noted that while light-source block 12b1 and light-source block 12b2 are substantially the same light-source block, different reference signs are used for the ease of description.

Light-source block 12b1 includes eight laser diodes 11b1 arranged in two rows (y direction in FIG. 4A, y direction in FIG. 4B) of four (x direction in FIG. 4A, z direction in FIG. 4B). Light-source block 12b2 includes eight laser diodes 11b2 arranged in two rows (y direction in FIG. 4A) of four (x direction in FIG. 4A).

It should be noted that while laser diodes 11b1 are shown in solid circles and laser diodes 11b2 are shown in dotted circles, laser diodes 11b1 and laser diodes 11b2 have substantially the same characteristic. Laser diodes 11b1 and 11b2 emit blue light having a peak emission wavelength of 455 nm, for example. Laser diodes 11b1 and 11b2 are each a lens integral LED which includes a collimate lens and emits light collimated by the collimate lens.

Moreover, first light-source unit 10a and second light-source unit 10b each include heat sink 13. Heat sink 13 is adhered to the rear surfaces of the light-source blocks via, for example, thermally conductive grease or the like.

Figure 5:
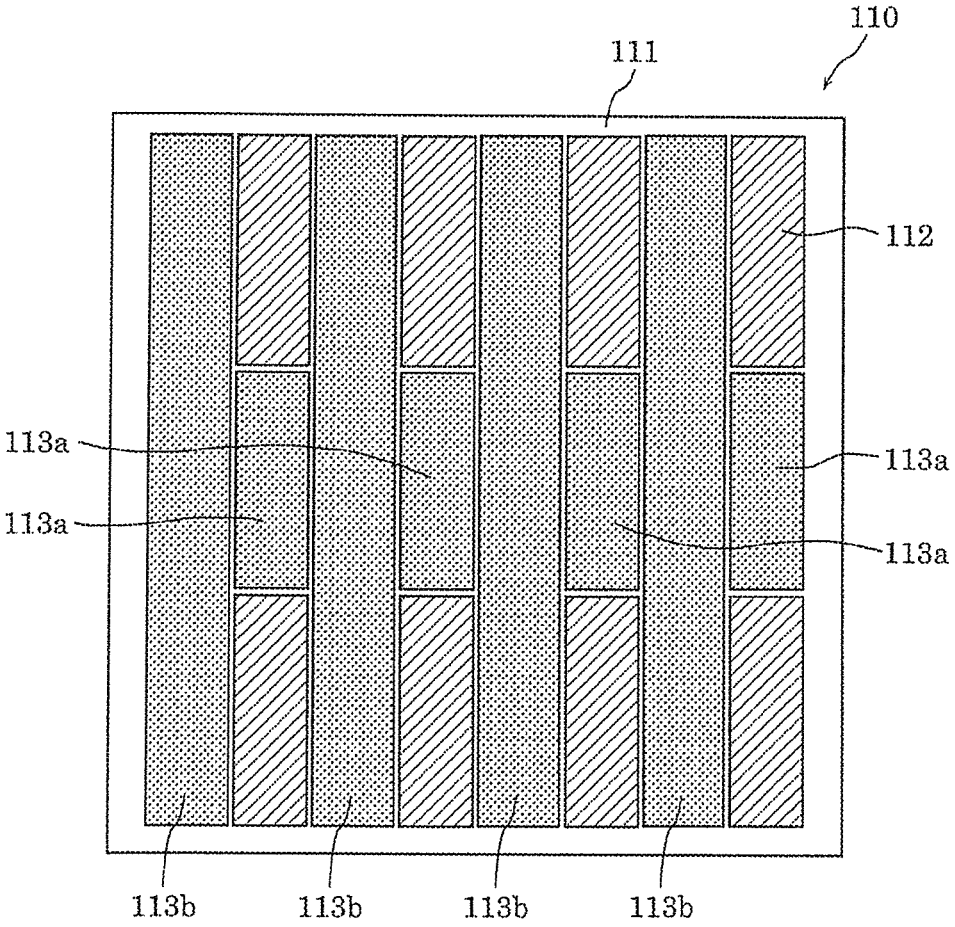
FIG. 5 is a diagram illustrating a configuration of the front surface of a splitting and combining mirror according to Embodiment 1.

Next, splitting and combining mirror 110 is described. FIG. 5 is a diagram illustrating a configuration of the front surface (an entrance face of the light from first light-source unit 10a) of splitting and combining mirror 110. As illustrated in FIG. 5, the front surface of splitting and combining mirror 110 includes substrate 111 having reflective areas 112 (diagonally-hatched portions), and transmissive areas 113a and 113b (dot-hatched portions) formed on substrate 111. Substrate 111 is, for example, a glass substrate.

On reflective area 112, a reflective film for reflecting the outgoing light from first light-source unit 10a and the outgoing light from second light-source unit 10b is formed. On transmissive areas 113a and 113b, antireflective coating for passing therethrough the outgoing light from first light-source unit 10a and the outgoing light from second light-source unit 10b is formed. It should be noted that antireflective coating may be formed on the rear surface of substrate 111 as well.

Figure 6:
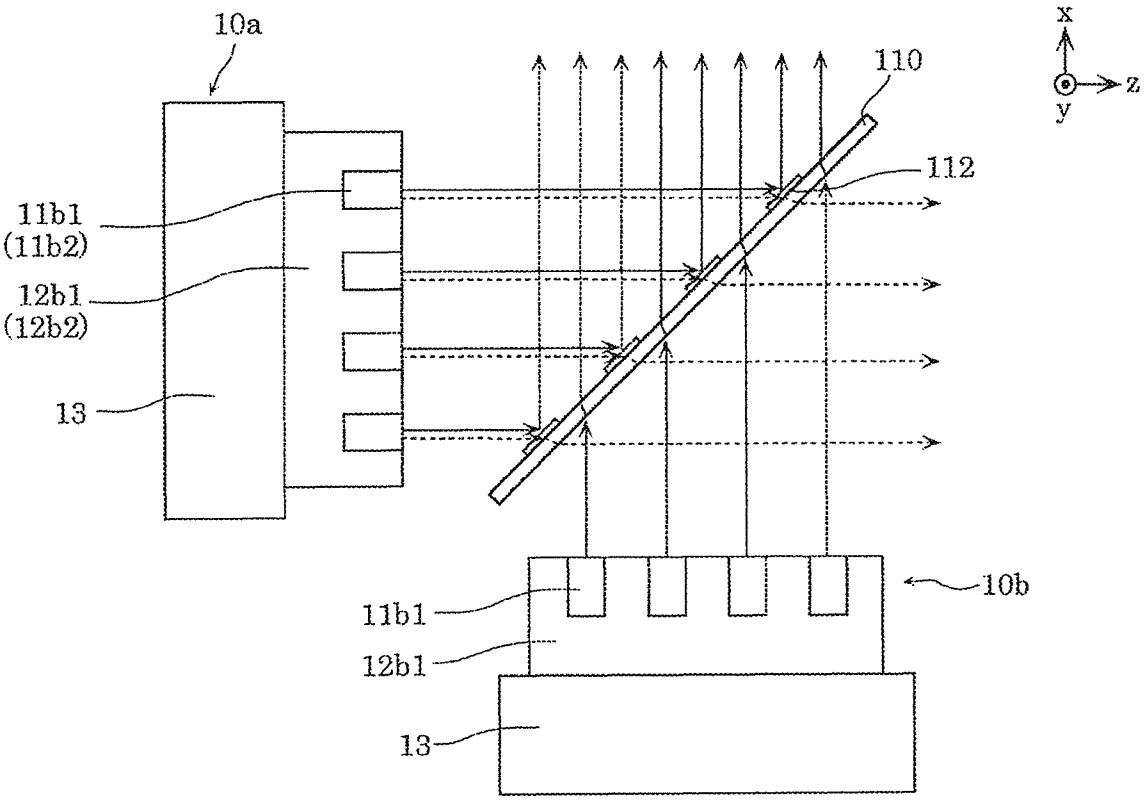
FIG. 6 is a diagram for illustrating splitting and combining capabilities of the splitting and combining mirror according to Embodiment 1.

Now, splitting and combining capabilities of splitting and combining mirror 110 are described with reference to FIG. 6. FIG. 6 is a diagram for illustrating splitting and combining capabilities of splitting and combining mirror 110.

As illustrated in FIG. 6, first light-source unit 10a emits blase light in z direction (first direction) and second light-source unit 10b emits blue light in x direction (second direction). As such, first light-source unit 10a and second light-source unit 10b are arranged so that respective light emitting directions, namely, the first direction and the second direction intersect with each other at 90 degrees. Splitting and combining mirror 110 is disposed at the intersection area and angled relative to the directions of blue light emitted by first light-source unit 10a and second light-source unit 10b.

Outgoing light from laser diodes 11b1 included in light-source block 12b1 of first light-source unit 10a is reflected by reflective areas 112 of splitting and combining mirror 110.

On the other hand, outgoing light (indicated by dotted arrows) from laser diodes 11b2 included in light-source block 12b2 of first light-source unit 10a transmit through transmissive areas 113a (not shown in FIG. 6) of splitting and combining mirror 110.

Outgoing light from laser diodes 11b1 included in light-source block 12b1 of second light-source unit 10b transmit through transmissive areas 113b of splitting and combining mirror 110.

At this time, light flux of the light from first light-source unit 10a reflected by splitting and combining mirror 110 and light flux of the light from second light-source unit 10b which has transmitted through splitting and combining mirror 110 are alternately arranged. Such arrangement is achieved by forming, in splitting and combining mirror 110, reflective areas 112, transmissive areas 113a, and transmissive areas 113b in correspondence with the locations of the light flux emitted by first light-source unit 10a and the light flux emitted by second light-source unit 10b.

As illustrated in FIG. 3, the blue it from first light-source unit 10a reflected by splitting and combining mirror 110 and the blue light from second light-source unit 10b transmitted through splitting and combining mirror 110 are combined to yield excitation light B1. Excitation light B1 excites phosphor wheel 20. Excitation light B1 passes along an optical path (first optical path) of lens 121, mirror 131, lens 122, top-hat diffusing element 141, dichroic mirror 132, lens 123, and lens 124, and illuminates the phosphor of phosphor wheel 20. This causes phosphor wheel 20 to emit yellow light Y1.

On the other hand, a portion of the blue light from first light-source unit 10a transmits through splitting and combining mirror 110. The portion is used as blue light B2 for use as image light. Blue light B2 passes along an optical path (second optical path) of lens 125, mirror 160, diffuser 142, lens 126, and dichroic mirror 132. Then, blue light B2 and yellow light Y1 mentioned above are combined by dichroic mirror 132 (i.e., the first optical path and the second optical path are combined into one), and exits dichroic mirror 132 as white light. The white light exited dichroic mirror 132 enters the entrance face of integrator rod 30.

[Top-Hat Diffusing Element]

Figure 7A:
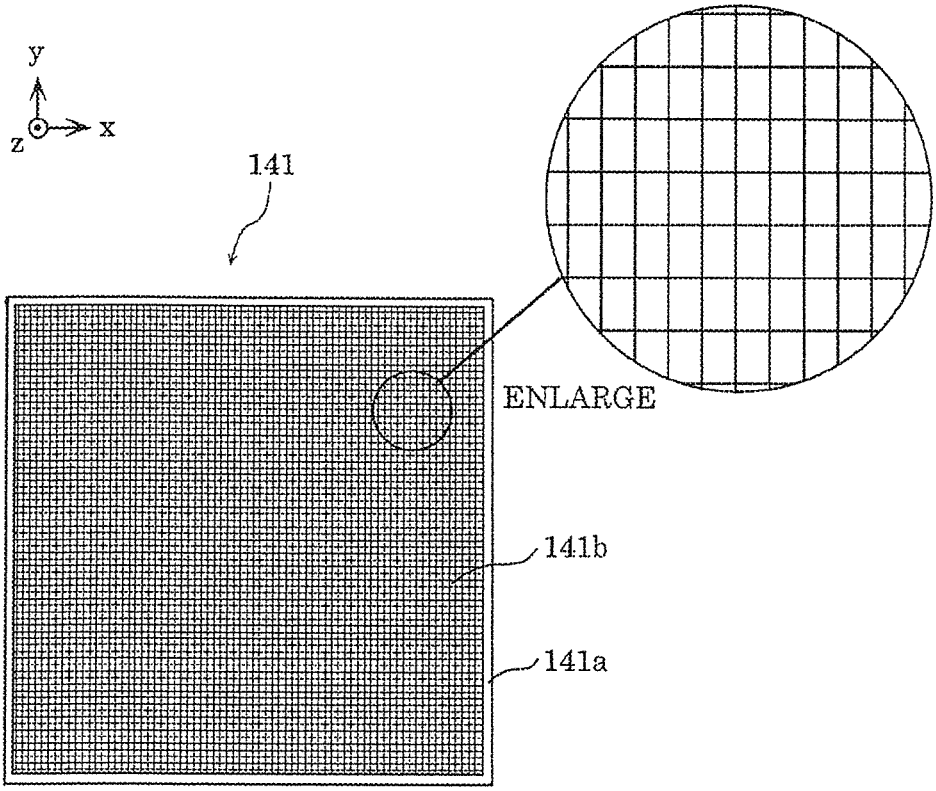
FIG. 7A is a plan view of a top-hat diffusing element according to Embodiment 1.
Figure 7B:
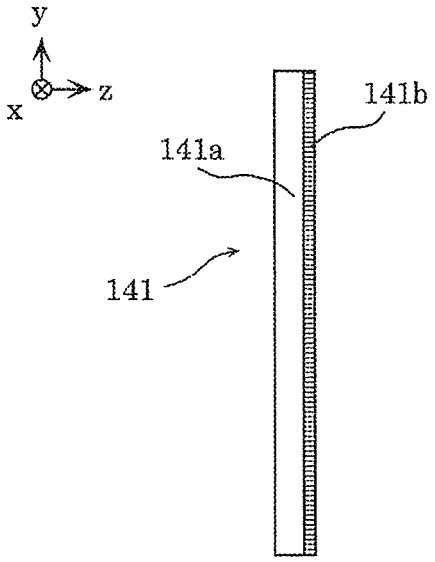
FIG. 7B is a side view of the top-hat diffusing element according to Embodiment 1.

Next, the structure and functionality of top-hat diffusing element 141 are described. Initially, the structure of top-hat diffusing element 141 is described. FIG. 7A is a plan view of top-hat diffusing element 141. FIG. 7B is a side view of top-hat diffusing element 141. It should be noted that FIG. 7A shows a portion (indicated by the circle) of top-hat diffusing element 141 to an enlarged scale.

Top-hat diffusing element 141 includes glass substrate 141a and micro-lens array layer 141b formed on glass substrate 141a. Micro-lens array layer 141b is configured of an array of at most 1 square mm of micro-lenses. Glass substrate 141a and micro-lens array layer 141b may be formed of the same material or may be formed of different materials. Micro-lens array layer 141b is formed by processing, such as pressing or etching a glass plate as a base material, for example. While FIG. 7A shows oblong micro-lenses arrayed regularly, the shapes of the micro-lenses may be randomly different to reduce the effects of interference.

Likewise, the micro-lenses may be arrayed randomly. Moreover, the micro-lenses each may have a convex surface or may have a concave surface. Moreover, the micro-lenses may be formed on both sides of glass substrate 141a.

Figure 8A:
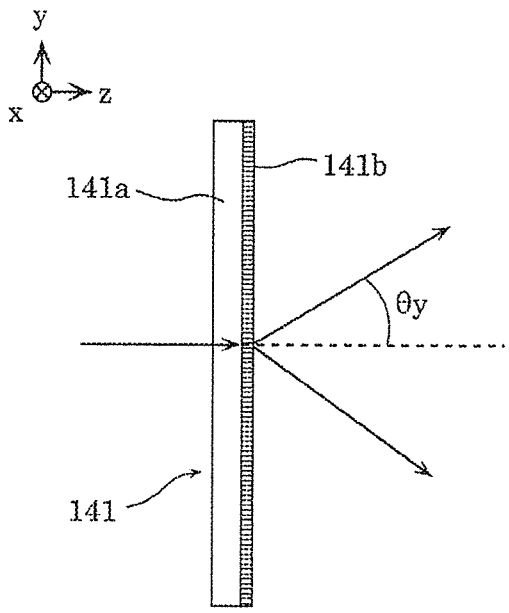
FIG. 8A is a diagram illustrating exit angle fax of outgoing light which has entered, at a zero-degree angle of incidence, the top-hat diffusing element according to Embodiment 1.
Figure 8B:
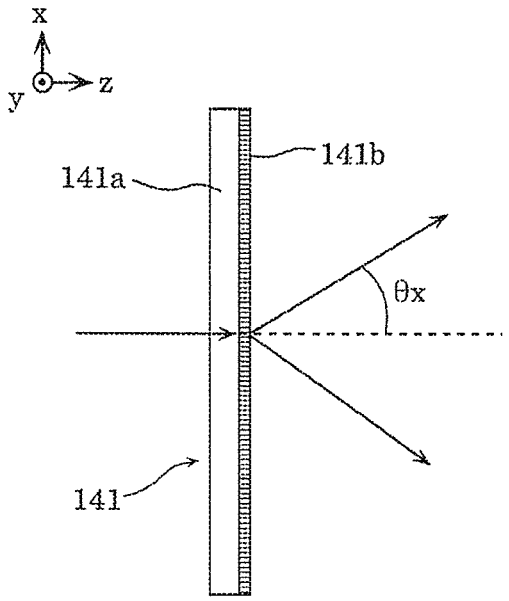
FIG. 8B is a diagram illustrating exit angle θy of the outgoing light which has entered, at a zero-degree angle of incidence, the top hat diffusing element according to Embodiment 1.

Next, the functionality of top-hat diffusing element 141 is described. FIG. 8A is a diagram illustrating exit angle θx of outgoing light which has entered, at a zero-degree angle of incidence, top-hat diffusing element 141. FIG. 8B is a diagram illustrating exit angle θy of the outgoing light which has entered, at a zero-degree angle of incidence, top-hat diffusing element 141.

Figure 9A:
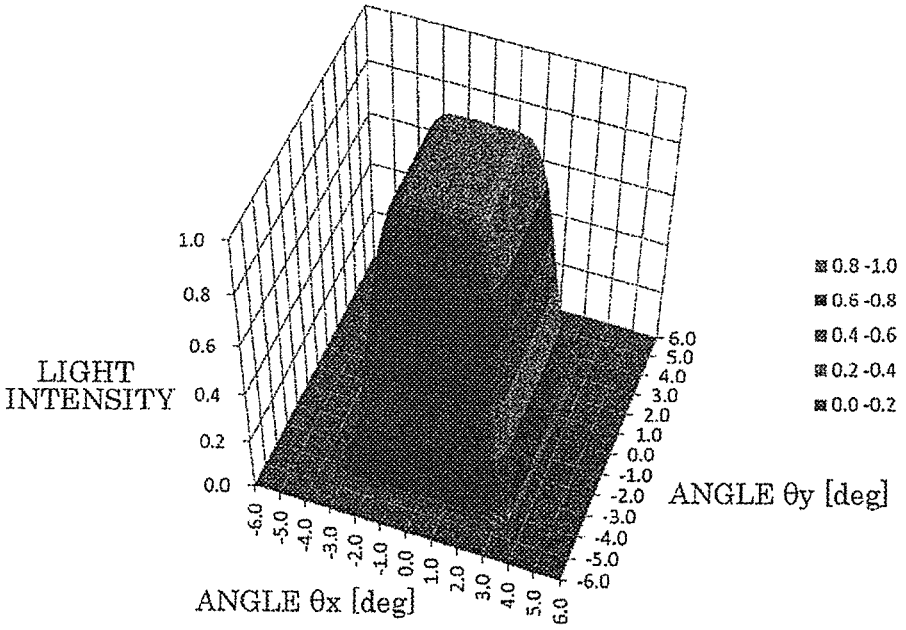
FIG. 9A is a diagram illustrating a diffusion angle characteristic of the top-hat diffusing element according to Embodiment 1.
Figure 9B:
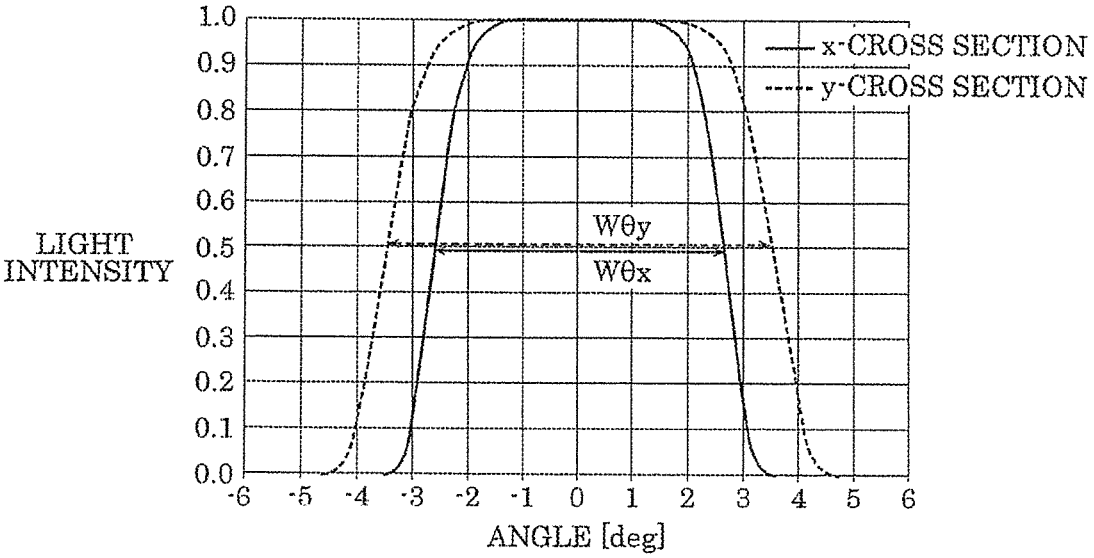
FIG. 9B is a diagram illustrating a light intensity in θx-cross section (cross section where θy=0) and a light intensity in θy-cross section (cross section where θx=0) in FIG. 9A.

FIG. 9A is a diagram illustrating diffusion angle characteristic of top-hat diffusing element 141. FIG. 9A specifically illustrates, as the diffusion angle characteristic, light intensity distribution (hereinafter, also simply referred to as intensity distribution) in θx-θy directions. FIG. 9B is a diagram illustrating a light intensity in θx-cross section (cross-section where θy=0) and a light intensity in θy-cross section (cross section where θx=0) in FIG. 9A.

As illustrated in FIG. 9A, the light diffused by top-hat diffusing element 141 has a top-hat intensity distribution (light intensity distribution or the diffusion angle characteristic for the exit angle) having a rectangular emission pattern (hereinafter, also simply referred to as a rectangular top-hat shape). More specifically, the diffusion angle characteristic is an oblong top-hat shape. In other words, as illustrated in FIG. 9B, full width at half maximum (FWHM) Wθy in θy-cross section (cross section where θx=0) is greater than FWHM Wθx in θx-cross section (cross section where θy=0).

It should be noted that the emission pattern (illumination pattern, light distribution pattern) refers to a light intensity distribution shape for the exit angle (diffusion angle characteristic) when the light intensity distribution is viewed in the direction of the light intensity axis (a beam shape in a two-dimensional plane and indicative of a diffusion angle). Stated differently, the emission pattern refers to a fact that a cross-sectional shape (plan view) of the diffusion angle characteristic (the light intensity distribution) in a θx-θy plane is rectangular. It should be noted that "rectangular" in this case is not meant to indicate rectangular in a strict sense, but means substantially rectangular (more rectangular than rounded).

Excitation light B1 entered top-hat diffusing element 141 as such is diffused in a rectangular shape and provided with the diffusion angle characteristic which is a rectangular top-hat shape. Then, the diffused excitation light B1 is condensed by lenses 123 and 124. Stated differently, lenses 123 and 124 condense excitation light B1 diffused by top-hat diffusing element 141, thereby converting an intensity distribution for the angle imparted to the diffuse excitation light B1 into a positional intensity distribution.

As a result, the light intensity distribution for the angle imparted to excitation light B1 is converted into a spatial (positional) light intensity distribution. Then, phosphor 22 (phosphor wheel 20) is illuminated by excitation light B1 having the rectangular top-hat spatial light intensity distribution.

Figure 10A:
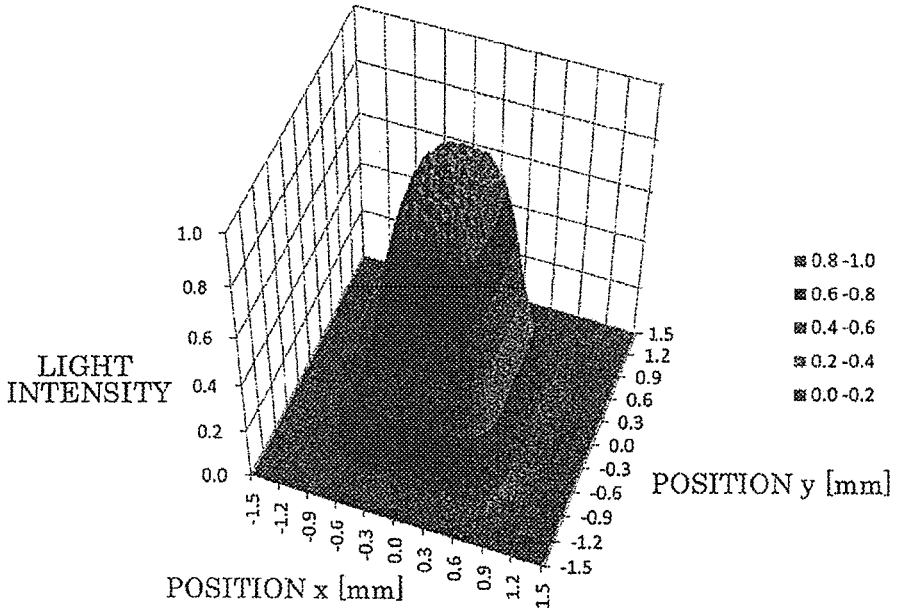
FIG. 10A is a diagram illustrating a light intensity distribution of excitation light which illuminates the phosphor wheel according to Embodiment 1.
Figure 10B:
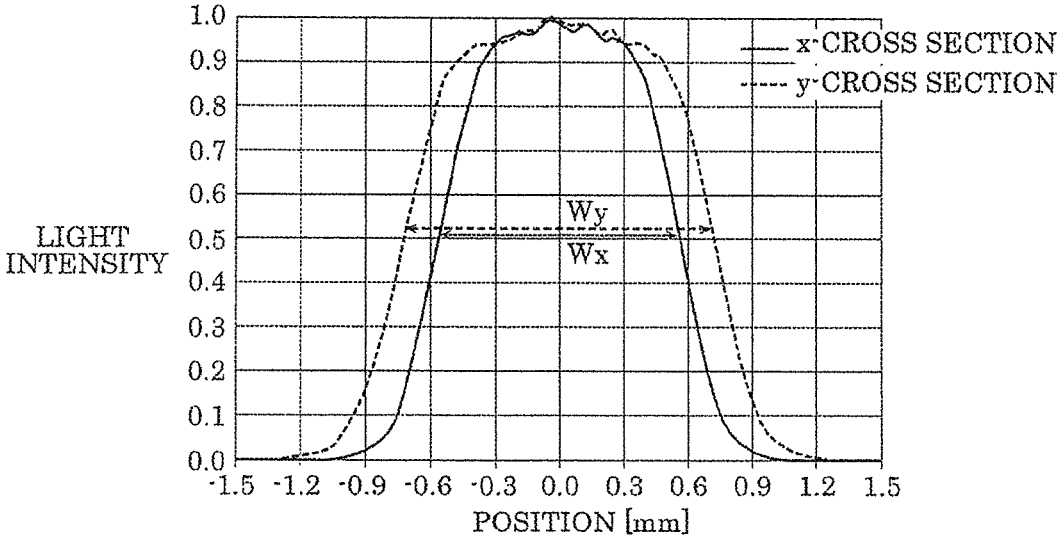

FIG. 10A is a diagram illustrating a light intensity distribution (spatial distribution) of excitation light B1 which illuminates phosphor wheel 20. FIG. 10A, specifically, is a diagram illustrating a light intensity distribution at position x-y on phosphor 22. FIG. 10B is a diagram illustrating light intensity in x-cross section (cross section where y=0) and light intensity in y-cross section (cross section where x=0) in FIG. 10A.

As illustrated in FIG. 10A, excitation light B1 which illuminates phosphor wheel 20 exhibits an oblong top-hat light intensity distribution, as with the diffusion angle characteristic of top-hat diffusing element 141. This is because excitation light B1 transmitted through top-hat diffusing element 141 exhibits a light intensity distribution (angular distribution) reflective of the diffusion angle characteristic illustrated in FIGS. 9A and 9B, and, before excitation light B1 is condensed at phosphor wheel 20 by lenses 123 and 124, the angular light intensity distribution of excitation light B1 is converted into a spatial light intensity distribution due to condensing effects of lenses 123 and 124.

As a result, FWHM Wx in x-cross section (cross section where y=0) and FWHM Wy in y-cross section (cross section where x=0) in FIG. 10B satisfy the relationship Wx:Wy=Wθy. Stated differently, the intensity distribution of the light to be emitted to phosphor wheel 20 can be controlled by changing the diffusion angle characteristic of top-hat diffusing element 141.

The light intensity distribution f excitation light B1 to be emitted to phosphor wheel 20 is homogenized by the functionality of top-hat diffusing element 141, and a peak light intensity of excitation light B1 decreases. The homogenization of the intensity distribution of excitation light B1 allows phosphor 22 of phosphor wheel 20 to be illuminated by excitation light B1 in a uniform manner, thereby enhancing the light emission efficiency of phosphor wheel 20.

It should be noted that top-hat diffusing element 141 may diffuse and provide excitation light B1 with a diffusion angle characteristic which is a rounded or oval top-hat shape. In this case also, the homogenization of the intensity distribution of excitation light B1 allows phosphor 22 of phosphor wheel 20 to be illuminated by excitation light B1 in a uniform manner, thereby enhancing the light emission efficiency of phosphor wheel 20.

Moreover, the intensity distribution (spatial distribution) of the light emitted by phosphor wheel 20 is substantially identical to the intensity distribution (spatial distribution) of excitation light B1 which illuminates phosphor wheel 20. In other words, the intensity distribution (spatial distribution) of the light to be emitted by phosphor wheel 20 can be controlled by changing the diffusion angle characteristic of top-hat diffusing element 141.

As illustrated in FIG. 1 or FIG. 3 above, the light emitted by phosphor wheel 20 is guided to integrator 30 via lenses 123, 124, 127, and 128. A point of emission of the light emitted by phosphor wheel 20 and the entrance face of integrator rod 30 are generally conjugate with each other, and thus the light intensity distribution (spatial distribution) on the entrance face of integrator rod 30 is approximately similar to the intensity distribution (spatial distribution) of the light emitted by phosphor wheel 20.

Figure 11:
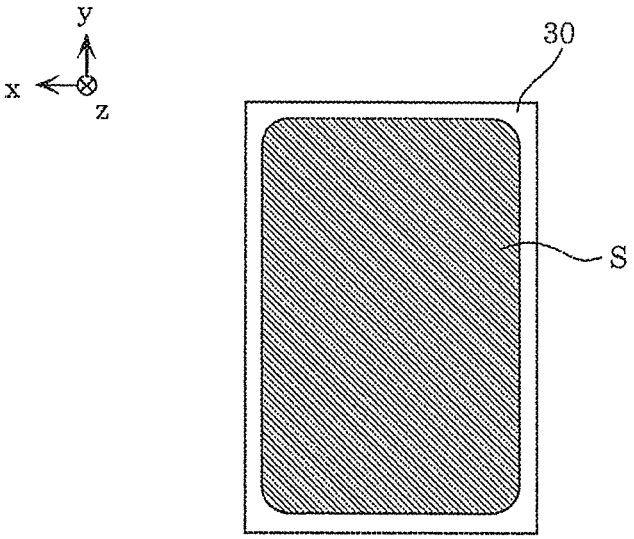
FIG. 11 is a diagram schematically illustrating a shape of light which enters an entrance face of an integrator rod according to Embodiment 1.

Here, as illustrated in FIG. 11, the light utilization efficiency is increased when shape S of the light which enters integrator rod 30 has an aspect ratio identical to the shape (a shape of the opening in the entrance face) of the rectangular entrance face of integrator rod 30. FIG. 11 is a diagram schematically illustrating a shape of the light which enters integrator rod 30. In other words, the light utilization efficiency can be increased if the aspect ratio of the diffusion angle characteristic of top-hat diffusing element 141 and the aspect ratio of the opening in the entrance face of integrator rod 30 are generally identical. In FIG. 11, the light which enters integrator rod 30 is shaped to conform to the interior surface of the opening in the entrance face of integrator rod 30.

The opening in the entrance face of integrator rod 30 has, for example, a size of width (x) of 5.5 mm×length (y) of 8.8 mm and an aspect ratio of 1.0:1.6. The diffusion angle characteristic of top-hat diffusing element 141 satisfies, for example, Wθx=5.0 degrees and Wθy=8.0 degrees, and has an aspect ratio satisfying Wθx:Wθy=1.0:1.6. In other words, the aspect ratio of the entrance face of integrator rod 30 is generally identical to the aspect ratio of the emission pattern. It should be noted that "generally identical" means that the aspect ratio of the entrance face of integrator rod 30 and the aspect ratio of the emission pattern are substantially identical. When the aspect ratio is expressed in transverse and longitudinal values, "generally identical" means that the aspect ratio of the emission pattern relative to the aspect ratio of the entrance face of integrator rod 30 has an error within 10%, for example.

It should be noted that the aspect ratio of the entrance face of integrator rod 30 is often made conform to the aspect ratio of image light. Thus, the aspect ratio of the entrance face of integrator rod 30 may be set to, for example, 0.9:1.6 or 1.2:1.6 (3:4), instead of 1.0:1.6. In accordance with this, the aspect ratio of the emission pattern of top-hat diffusing element 141 may also be set to satisfy that Wθx:Wθy is 0.9:1.6 or 1.2:1.6. The aspect ratio (transverse and longitudinal values) of the emission pattern of top-hat diffusing element 141 may be 0.5625 (0.9/1.6) or greater and 0.75 (1.2/1.6f) or less.

(Actions and Effects)

As described above, projection image display device 100 includes: laser diodes 11b1 (second light-source unit 10b) which emit excitation light B1; top-hat diffusing element 141 which diffuses and provides excitation light B1 with a top-hat intensity distribution; and phosphor 22 (phosphor wheel 20) which emits light when illuminated by excitation light B1 diffused by top-hat diffusing element 141. Projection image display device 100 also includes: integrator rod 30 which homogenizes an intensity distribution of the light emitted by phosphor wheel 20; DMDs (DMD 40r, DMD 40g, and DMD 40b) which modulate the light whose intensity distribution has been homogenized by integrator rod 30; and projector 50 which projects, as an image, the light modulated by the DMDs. Laser diodes 11b1 (second light-source unit 10b) are, by way of example, the laser light source. Phosphor 22 (phosphor wheel 20) is, by way of example, the light emitter. Integrator rod 30 is, by way of example, the light homogenization element. The DMDs are, by way of example, the light modulating element.

The condensation of excitation light B1 diffused by top-hat diffusing element 141 as described above allows the homogenization of the intensity distribution of the excitation light which is to illuminate phosphor wheel 20. The homogenization of the intensity distribution allows phosphor 22 of phosphor wheel 20 to be illuminated by the excitation light in a uniform manner, thereby enhancing the light emission efficiency of phosphor wheel 20. In other words, projection image display device 100 having enhanced light utilization efficiency is achieved.

Moreover, top-hat diffusing element 141 may provide excitation light B1 with a top-hat intensity distribution having a circular emission pattern. In Embodiment 1, however, top-hat diffusing element 141 diffuses and provides excitation light B1 with the top-hat intensity distribution that has a rectangular emission pattern.

Projection image display device 100 emits rectangular image light at end. In that case, a loss is caused when the beam shape is circular. The beam shape is rectangular as with the image light if top-hat diffusing element 141 provides excitation light B1 with the top-hat intensity distribution having the rectangular emission pattern, thereby enhancing the light utilization efficiency of projection image display device 100.

Moreover, integrator rod 30 may be an integrator rod having, for example, a rectangular entrance face, and an aspect ratio of the entrance face of integrator rod 30 may be generally identical to an aspect ratio of the emission pattern. Stated differently, the aspect ratio of the emission pattern of top-hat diffusing element 141 and the aspect ratio of the entrance face (the size of the opening it the entrance face) of integrator rod 30 may be brought into conformity.

This allows light in accordance with the size of the entrance face of integrator rod 30 to enter integrator rod 30, thereby enhancing the light utilization efficiency of projection image display device 100.

Moreover, projection image display device 100 further includes lenses 123 and 124 which condense excitation light B1 diffused by top-hat diffusing element 141 to convert an intensity distribution for an angle imparted to diffused excitation light B1 into a positional intensity distribution. Phosphor 22 emits light when illuminated by excitation light B1 diffused by top-hat diffusing element 141 and condensed by lenses 123 and 124.

This allows the homogenization of the positional intensity distribution of the excitation light to be emitted to phosphor wheel 20. The homogenization of the positional intensity distribution of excitation light B1 allows phosphor 22 of phosphor wheel 20 to be illuminated by excitation light B1 in a uniform manner, thereby enhancing the light emission efficiency of phosphor wheel 20. In other words, projection image display device 100 having enhanced light utilization efficiency is achieved.

Embodiment 2

In the following, a projection image display device according to Embodiment 2 is described. In Embodiment 2, differences from Embodiment 1 are mainly described and description already set forth in Embodiment 1 is omitted.

Figure 12A:
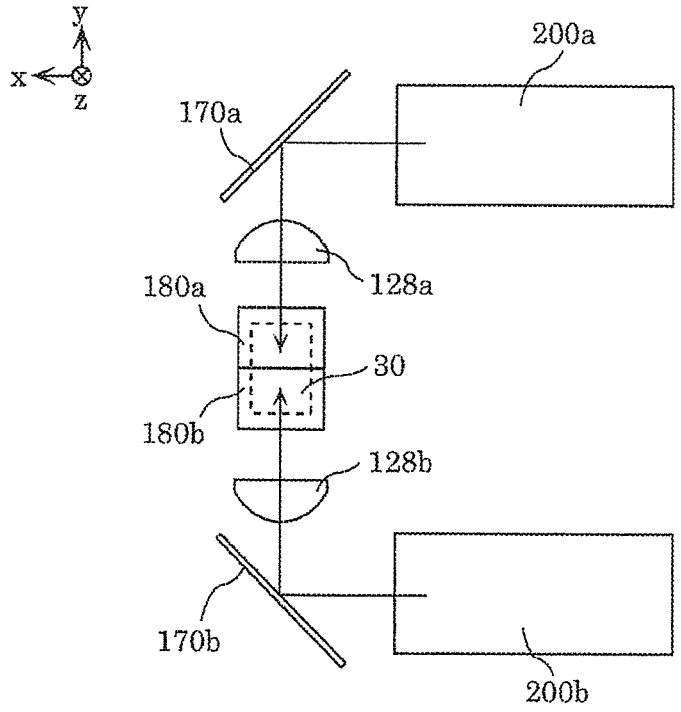
FIG. 12A is a first diagram illustrating an optical arrangement of main components included in a projection image display device according to Embodiment 2 of the present disclosure.
Figure 12B:
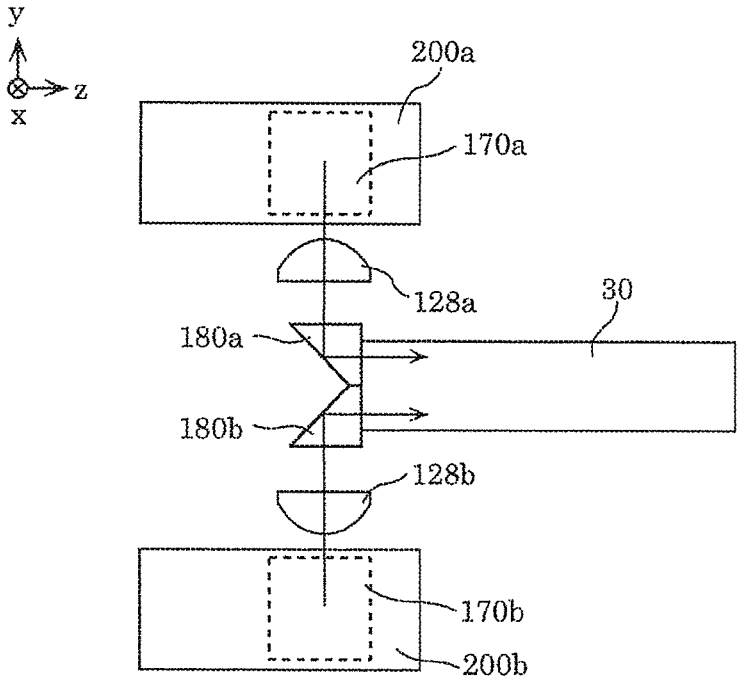
FIG. 12B is a second diagram illustrating the optical arrangement of the main components included in the projection image display device according to Embodiment 2.

FIGS. 12A and 12B are diagrams illustrating an optical arrangement of main components included in the projection image display device according to Embodiment 2. The main components in arrangement includes, namely, those between light-source devices 200a and 200b and integrator rod 30 both inclusive. Components subsequent to integrator rod 30 are the same as in FIG. 1.

As illustrated in FIGS. 12A and 12B, the projection image display device according to Embodiment 2 includes two light-source devices same as light-source device 200 according to Embodiment 1. Specifically, the projection image display device includes light-source device 200a and light-source device 200b. The projection image display device also includes mirror 170a, lens 128a, and reflective prism 180a between light-source device 200a and integrator rod 30. The projection image display device includes mirror 170b, lens 128b, and reflective prism 180b between light-source device 200b and integrator rod 30.

Mirror 170a reflects, in negative y direction, light which is emitted by light-source device 200a, and mirror 170b reflects, in positive y direction, light which is emitted by light-source device 200b. In other words, the light reflected by mirror 170a and the light reflected by mirror 170b travel toward each other.

Lens 128a condenses the light reflected by mirror 170a. Lens 128b condenses the light reflected by mirror 170b. Reflective prism 180a reflects the light exited lens 128a to guide it to the entrance face of integrator rod 30. Reflective prism 180b reflects the light exited lens 128b to guide it to the entrance face of integrator rod 30.

Figure 13:
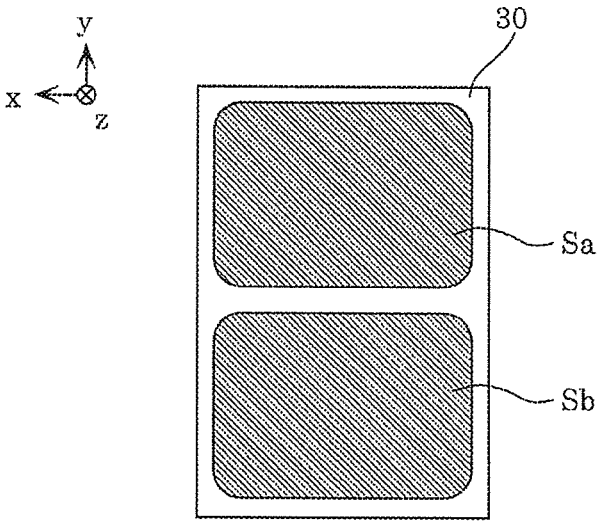
FIG. 13 is a diagram schematically illustrating shapes of light which enter an entrance face of an integrator rod according to Embodiment 2.

FIG. 13 is a diagram schematically illustrating shapes of light which enter an entrance face of integrator rod 30. The light emitted by light-source device 200a enters region Sa of the entrance face (the opening of the entrance face). The light emitted by light-source device 200b enters region. Sb of the entrance face. In other words, light emitted by the light-source devices (light-source devices 200a and 200b) enter respective rectangular regions (regions Sa and Sb) of the entrance face of integrator rod 30. Regions Sa and Sb are obtained by equally dividing the entrance face of integrator rod 30.

As with Embodiment 1, the opening in the entrance face of integrator rod 30 has the size of width (x) of 5.5 mm×length of (y) 8.8 mm. In Embodiment 2, a diffusion angle characteristic of top-hat diffusing element 141 satisfies Wθx=6.0 degrees and Wθy=7.5 degrees, and has an aspect ratio satisfying Wθx:Wθy=1.0:1.25.

Regions Sa and Sb are obtained by vertically dividing the entrance face of integrator rod 30 equally into two. Thus, regions Sa and Sb each have a size of length 4.4 min×width 5.5 min and an aspect ratio of 1.0:1.25. As such, for light from two light-source devices (light-source devices 200a and 200b) are combined and enter integrator rod 30, the aspect ratios of the two regions (regions Sa and Sb) dividing into the size of the opening in the entrance face of integrator rod 30 may be generally identical to the aspect ratio of the diffusion angle characteristic of top-hat diffusing element 141.

It should be noted that although the diffusion angle characteristic of top-hat diffusing element 141 according to Embodiment 2 is vertically long (elongated in y direction), the light which enter regions Sa and Sb are horizontally long (elongated in x direction). This is because outgoing light from light-source device 200a passes through two reflective surfaces (passes through mirror 170a and reflective prism 180a) and thereby the light flux is rotated by 90 degrees. Likewise, outgoing light from light-source device 200b passes through two reflective surfaces (passes through mirror 170b and reflective prism 180b) and thereby the light flux is rotated by 90 degrees.

(Actions and Effects)

As described above, the projection image display device according to Embodiment 2 includes at least two light-source devices each including laser diodes 11b1 (second light-source unit 10b), top-hat diffusing element 141, and phosphor wheel 20. Integrator rod 30 included in the projection image display device has a rectangular entrance face. The light emitted by the at least two light-source devices (light-source device 200a and light-source device 200b) enter rectangular regions (regions Sa and Sb) of the entrance face of integrator rod 30. The aspect ratios of the regions are generally identical to the aspect ratio of an emission pattern. Stated differently, the aspect ratio of the emission pattern of top-hat diffusing element 141 and the aspect ratios of the regions dividing, in two, the opening in the entrance face of integrator rod 30 are brought into conformity.

This allows the light from light-source device 200a to enter integrator rod 30 according to the size of region Sa, and the light from light-source device 200b to enter integrator rod 30 according to the size of region Sb, thereby enhancing the light utilization efficiency of the projection image display device. Optical arrangement using such two light-source devices is useful if one wants to obtain large image light.

It should be noted that the projection image display device may include three or more light-source devices and light emitted by the three or more light-source devices may enter integrator rod 30.

Embodiment 3

In the following, a projection image display device according to Embodiment 3 is described. In Embodiment 3, differences from Embodiment 1 are mainly described and description already set forth in Embodiment 1 is omitted.

Figure 14:
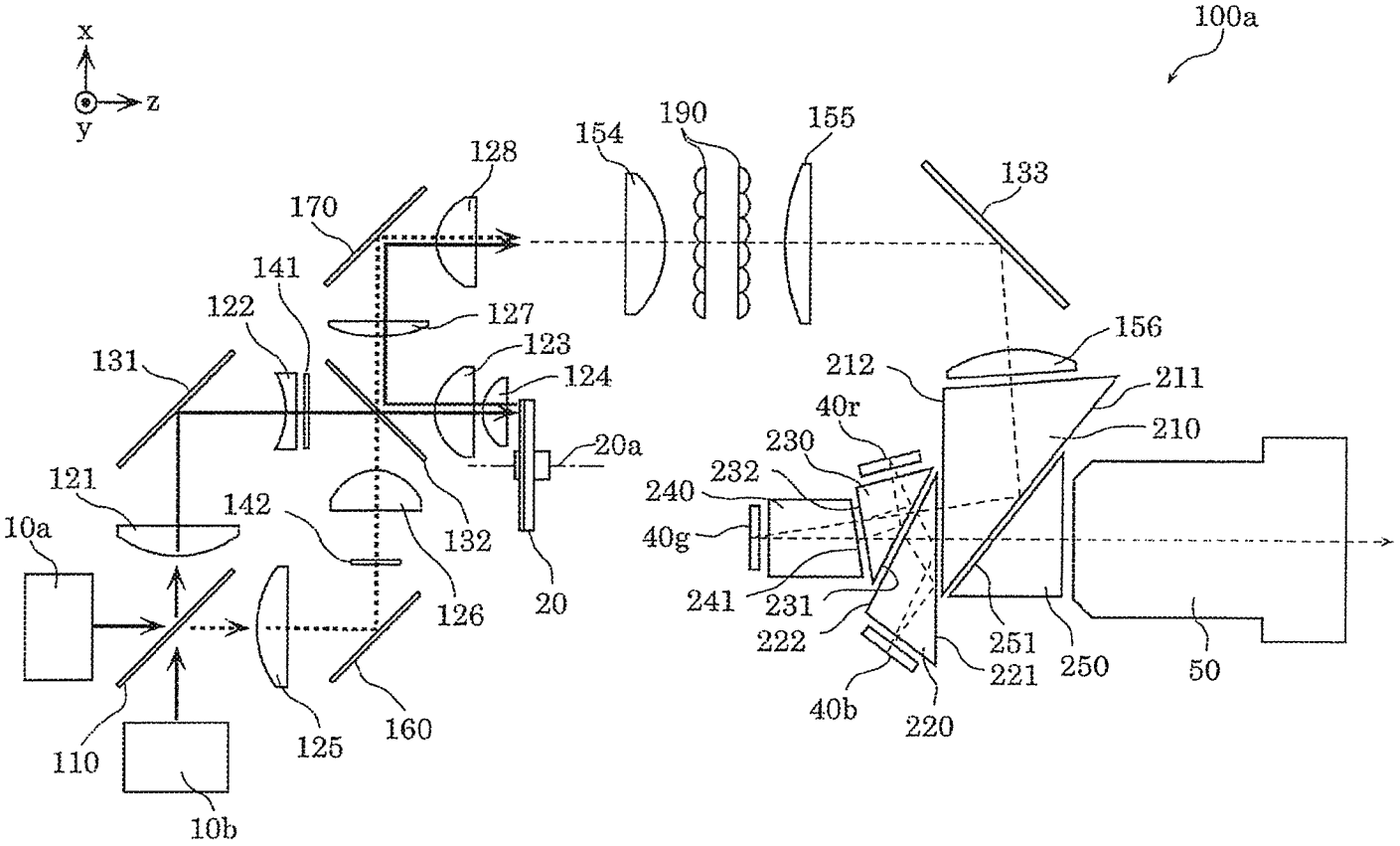
FIG. 14 is a diagram illustrating an optical arrangement of a projection image display device according to Embodiment 3 of the present disclosure.

FIG. 14 is a diagram illustrating an optical arrangement of the projection image display device according to Embodiment 3. Projection image display device 100a according to Embodiment 3 includes a pair of fly-eye lenses 190 (a pair of lens arrays) in place of integrator rod 30. Projection image display device 100a also includes lenses 154, 155, and 156.

Lens 154 collimates light condensed by lens 128. The pair of fly-eye lenses 190 includes cells and has a functionality of dividing, by the cells, the light collimated by lens 128 into light beams and superimposing the light beams one over another to homogenize the light intensity of the light, as with integrator rod 30. Lenses 155 and 156 guide the light exited the pair of fly-eye lenses 190 to DMDs (DMD 40r, DMD 40g, and DMD 40b). The pair of fly-eye lenses 190 is another example of the light homogenization element.

The cells of the pair of fly-eye lenses 190 have a size of width (x) of 3.0 mm×length (y) of 4.8 mm, and an aspect ratio of 1.0:1.6. The diffusion angle characteristic of top-hat diffusing element 141 satisfies Wθx=5.0 degrees and Wθy=8.0 degrees, and has an aspect ratio satisfying Wθx: Wθy=1.0:1.6.

(Actions and Effects)

As described above, the light homogenization element according to Embodiment 3 is a pair of fly-eye lenses 190, and an aspect ratio of the cells of the pair of fly-eye lenses 190 is generally identical to the aspect ratio of the diffusion angle characteristic of top-hat diffusing element 141.

As such, the aspect ratio of the emission pattern of top-hat diffusing element 141 and the aspect ratio of the size of each cell of the pair of fly-eye lenses 190 are brought into conformity, thereby enhancing the light utilization efficiency of projection image display device 100a.

Other Embodiments

As such, Embodiments 1 to 3 have been described as an example of the technology disclosed herein. The technology according to the present disclosure, however, is not limited thereto and is applicable to any embodiments to which modifications, permutations, additions, and omissions are made. Alternatively, the components set forth with reference to Embodiments 1 to 3 described above may be combined into a new embodiment. For this purpose, other embodiments are illustrated in the following.

While Embodiments 1 to 3 have been described with reference to the light modulating element being three DMDs, the embodiments of the present disclosure is not limited thereto. The projection image display device may include only one DMD as the light modulating element. Alternatively, as the light modulating element, the projection image display device may include only one liquid crystal panel or may include three crystal panels (a red liquid crystal panel, a green liquid crystal panel, and a blue liquid crystal panel). The liquid crystal panel may be light transmissive or may be light reflective.

While Embodiments 1 to 3 have been described with reference to phosphor wheel 20 being the light emitter which produces reference light, embodiments of the present disclosure is not limited thereto. The light emitter may be a static, inorganic phosphor ceramic. Moreover, the light emitter may be a fluorescent material, instead of or in addition to the phosphor. The phosphor may be a fluorescent material or may be a phosphorescent material.

Moreover, the optical arrangement shown in the above embodiments is by way of example, and the present disclosure is not limited to the above optical arrangement. In other words, in addition to the optical arrangement described above, any optical arrangement which can achieve the feature functionality of the present disclosure is also included within the scope of the present disclosure. For example, some of the optical components used in the optical arrangement described above may be omitted to an extent that can achieve the same or similar functionality of the optical arrangement described above, or other optical components may be added to the optical arrangement described above.

Moreover, the components set forth in the accompanying drawings and detailed description include not only components essential to solve the problems but also components unnecessary to solve the problems, for illustrating the above technology. Hence, the unnecessary components should not be acknowledged essential due to the mere fact that they are depicted in the accompanying drawings or set forth in the detailed description.

The above embodiments are for illustrating the technology of the present disclosure, and thus various modifications, permutations, additions, and omissions are possible in the scope of the appended claims and the equivalents thereof.

INDUSTRIAL APPLICABILITY

The present disclosure is applicable to projection image display devices such as projectors.

What is claimed is:

[1. A projection image display device comprising:

a laser light source which emits excitation light;

a top-hat diffusing element which diffuses and provides the excitation light with a top-hat intensity distribution;

a light emitter which emits light when illuminated by the excitation light diffused by the top-hat diffusing element;

a light homogenization element which homogenizes an intensity distribution of the light emitted by the light emitter;

a light modulating element which modulates the light whose intensity distribution has been homogenized by the light homogenization element; and a projector which projects, as an image, the light modulated by the light modulating element, wherein the top-hat diffusing element diffuses and provides the excitation light with the top-hat intensity distribution having an emission pattern which is rectangular in shape, the light homogenization element is an integrator rod utilizing internal reflections of the light from the light emitter to homogenize the intensity distribution of the light, and the integrator rod has an entrance face which is rectangular in shape.]

[2. The projection image display device according to claim 1, wherein an aspect ratio of the entrance face is generally identical to an aspect ratio of the emission pattern.]

[3. The projection image display device according to claim 1, comprising at least two light-source devices each including the laser light source, the top-hat diffusing element, and the light emitter, wherein the light homogenization element is an integrator rod having an entrance face which is rectangular in shape, light emitted by the at least two light-source devices enter a plurality of regions of the entrance face, the plurality of regions being rectangular in shape, and aspect ratios of the plurality of regions are generally identical to an aspect ratio of the emission pattern.]

[4. The projection image display device according to claim 1, wherein the light homogenization element is a pair of fly-eye lenses, and an aspect ratio of each of cells of the pair of fly-eye lenses is generally identical to an aspect ratio of the emission pattern.]

[5. The projection image display device according to claim 1, further comprising a lens which condenses the excitation light diffused by the top-hat diffusing element to convert the top-hat intensity distribution for an angle imparted to the diffused excitation light into a positional intensity distribution, wherein the light emitter emits light when illuminated by the excitation light diffused by the top-hat diffusing element and condensed by the lens.]

*6. A projection image display device comprising:*

*a laser light source including first and second light source units, which emits excitation light, wherein the first light source unit emits a part of the excitation light in a first direction, and the second light source unit emits another part of the excitation light in a second direction different from the first direction;*

*a top-hat diffusing element which diffuses and provides the excitation light with a top-hat intensity distribution, the excitation light from the laser light source being directed from a mirror to the top-hat diffusing element;*

*a light emitter which emits light when illuminated by the excitation light diffused by the top-hat diffusing element;*

*a light homogenization element which homogenizes an intensity distribution of the light emitted by the light emitter;*

*a light modulating element which modulates the light having intensity distribution homogenized by the light homogenization element; and*

*a projector which projects, as an image, the light modulated by the light modulating element,*

*wherein the excitation light partially separated by the mirror is reflected and diffused on a light path between the mirror and the light homogenization element and merged with the light from the light emitter;*

*wherein the top-hat diffusing element diffuses and provides the excitation light with the top-hat intensity distribution having an emission pattern which is rectangular in shape,*

*wherein the light homogenization element is an integrator rod utilizing internal reflections of the light from the light emitter to homogenize the intensity distribution of the light, and*

*wherein the integrator rod has an entrance face which is rectangular in shape.*

*7. The projection image display device according to claim 6, wherein the top-hat diffusing element includes a plurality of micro lenses.*

*8. The projection image display device according to claim 7, wherein each of the plurality of micro lenses has an area of 1 $mm^2$ or less.*

*9. The projection image display device according to claim 6, wherein*

*the excitation light partially separated by the mirror is part of light from the first light source unit, and*

*light from the second light source unit enters the light emitter.*

*10. The projection image display device according to claim 9, further comprising a diffuser configured to diffuse the excitation light partially separated by the mirror, wherein*

*the diffused light from the diffuser is merged with the light from the light emitter, and*

*the integrator rod homogenizes the merged light.*

*11. The projection image display device according to claim 10, wherein*

*the first light source unit comprises a plurality of laser light elements, and*

*a number of the laser light elements emitting light which is to enter the diffuser is less than a number of the laser light elements emitting light which is to enter the light emitter.*

*12. The projection image display device according to claim 6, wherein*

*the merged light enters a plurality of regions of the entrance face, the plurality of regions being rectangular in shape, and*

*aspect ratios of the plurality of regions are generally identical to an aspect ratio of the emission pattern.*

*13. The projection image display device according to claim 6, further comprising a lens which condenses the excitation light diffused by the top-hat diffusing element to convert the top-hat intensity distribution for an angle imparted to the diffused excitation light into a positional intensity distribution, wherein*

*the light emitter emits the light when illuminated by the excitation light diffused by the top-hat diffusing element and condensed by the lens.*

* * * * *